(12) United States Patent
Lohia et al.

(10) Patent No.: US 8,003,031 B2
(45) Date of Patent: Aug. 23, 2011

(54) METHOD AND APPARATUS FOR PRODUCING ORIENTED SLIT FILM TAPES

(75) Inventors: Amit Kumar Lohia, Kanpur (IN); Harendra Kumar Anand, Kanpur (IN)

(73) Assignee: Lohia Starlinger Limited, Uttar Pradesh (IN)

( * ) Notice: Subject to any disclaimer, the term of this patent is extended or adjusted under 35 U.S.C. 154(b) by 0 days.

(21) Appl. No.: 12/094,290

(22) PCT Filed: Nov. 16, 2006

(86) PCT No.: PCT/IN2006/000453
§ 371 (c)(1),
(2), (4) Date: May 20, 2008

(87) PCT Pub. No.: WO2007/057923
PCT Pub. Date: May 24, 2007

(65) Prior Publication Data
US 2008/0258333 A1    Oct. 23, 2008

(30) Foreign Application Priority Data
Nov. 21, 2005 (IN) .................................. 3097/2005

(51) Int. Cl.
*B29C 55/30* (2006.01)
(52) U.S. Cl. .................... 264/146; 264/147; 264/210.1; 264/211.12; 264/230; 264/235; 264/176.1; 264/288.4; 264/290.5; 425/307; 425/305; 425/66
(58) Field of Classification Search .................. 264/146, 264/147, 210.1, 211.12, 230, 176.1, 211.13, 264/235, 290.2, 288.4, 289.6, 288, 234, 290.5, 264/210.7, DIG. 73; 425/307, 315, 305, 425/66
See application file for complete search history.

(56) References Cited

U.S. PATENT DOCUMENTS
3,800,008 A * 3/1974 Starkweather, Jr. .......... 525/222
(Continued)

FOREIGN PATENT DOCUMENTS
CA      946565      5/1974
(Continued)

OTHER PUBLICATIONS
International Search Report, Application No. PCT/IN2006/000453, mailed Mar. 6, 2007.

*Primary Examiner* — Khanh Nguyen
*Assistant Examiner* — Keith T Aziz
(74) *Attorney, Agent, or Firm* — Renner, Otto, Boisselle & Sklar

(57) ABSTRACT

The invention relates to a method for producing oriented slit film tapes, comprising the following steps: extruding melt polymer through a die (2); simultaneous quenching and melt-drawing of the molten polymer in the cooling device to form a film sheet (3); slitting the initial film sheet into a plurality of relatively narrow slit film tapes (4); stretching (8) at elevated temperature, by passing the slit film tapes through a heating medium (7) at a temperature just below the softening temperature of the slit film tapes; y annealing and cooling the oriented slit film tapes (10, 11); winding the slit film tapes (13); characterized in that before the stretching step, it has a stage of pre-stretching (108) made by passing the slit film tapes through one set of heated holding rollers (107) turning at a given speed and one set of cooled pre-stretch rollers (109) turning faster than the heated holding rollers, wherein at least one of the rollers of the set of holding rollers is heated and at least one of the rollers of the set of pre-stretch rollers is cooled. The invention also relates to an apparatus for performing this method and to the products obtained by said method.

15 Claims, 2 Drawing Sheets

U.S. PATENT DOCUMENTS

Figure 1:
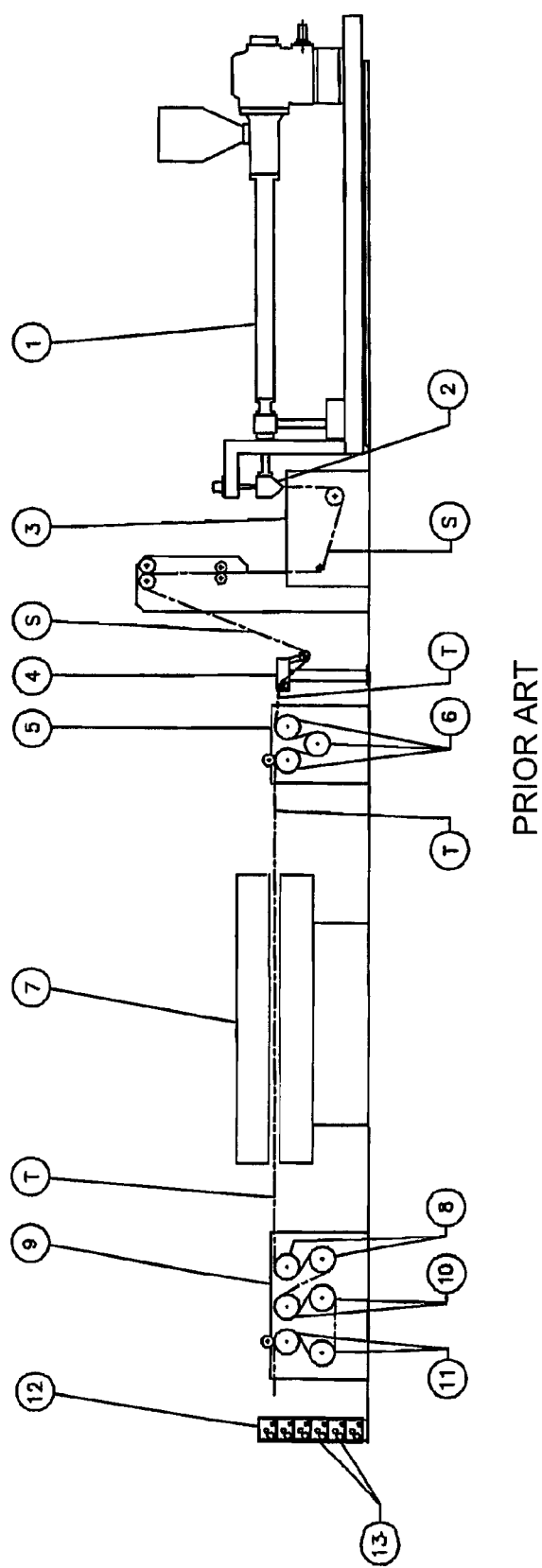

| | | | |
|---|---|---|---|
| 4,022,863 A | | 5/1977 | Karass et al. |
| 4,113,935 A | | 9/1978 | Schippers et al. |
| 4,405,775 A | * | 9/1983 | Hashimoto .................. 526/351 |
| 4,503,007 A | * | 3/1985 | Matsumoto ................ 264/210.7 |
| 5,660,787 A | * | 8/1997 | Van Erden et al. .......... 264/476 |
| 5,772,944 A | | 6/1998 | DiPede et al. |
| 5,851,610 A | * | 12/1998 | Ristey et al. ................. 428/34.9 |
| 6,054,086 A | * | 4/2000 | Kurihara et al. .............. 264/147 |
| 6,328,923 B1 | * | 12/2001 | Jones et al. ................... 264/494 |
| 6,395,147 B1 | * | 5/2002 | Wheat et al. ............. 204/192.14 |
| 2003/0183975 A1 | * | 10/2003 | Gownder et al. ............ 264/146 |
| 2004/0084802 A1 | * | 5/2004 | Morin et al. .................. 264/147 |
| 2004/0113324 A1 | * | 6/2004 | Jones et al. ................... 264/485 |
| 2006/0009603 A1 | * | 1/2006 | Young et al. ................ 526/348.1 |
| 2007/0200270 A1 | * | 8/2007 | Lauckner et al. ............. 264/146 |

FOREIGN PATENT DOCUMENTS

| | | | |
|---|---|---|---|
| EP | 1277573 | | 1/2003 |
| GB | 1275290 | | 5/1972 |
| GB | 1407580 | | 9/1975 |
| GB | 1407580 A | * | 9/1975 |

* cited by examiner

METHOD AND APPARATUS FOR PRODUCING ORIENTED SLIT FILM TAPES

The present invention relates to a method for producing oriented slit film tapes, to an apparatus for performing this method and to the products obtained by said method.

Slit film tapes, also known as film bands, strips, slit film tapes, raffia tapes, tape yarn and mono-axially oriented tapes are defined as unidirectional oriented thermoplastic products with a high width-to-thickness ratio.

Slit film tapes made of polyolefin's such as polypropylene (PP), high density polyethylene (HDPE) and linear low density polyethylene (LLDPE) and other similar polymeric materials are well known and have several applications. The major areas of application includes woven sacks, large industrial sacks and packaging fabrics, geo-textiles, ropes and twines and miscellaneous industrial woven fabrics.

Slit film tapes can be produced from extruded cast flat or tubular (blown) film. Blown film is best for certain types of thin slit film tape yarns. The majority of slit film tapes are made from cast films. Generally, the slit film tapes are formed by slitting of extruded film sheet which are then stretched by using one of the two known processes, stretching slit film together as a single bundle or individually in several group/bundles of strips.

An example of the multi-stage stretch can be seen in U.S. Pat. No. 4,113,935 that relates to a process for producing low shrinkage film bands. In this method desired orientation in slit film tape is accomplished through a series of rollers with increasing speeds and increasing temperature. After the slit film tapes have been stretched in the machine direction, they may be reheated on a set of heated rollers and cooled on a set of cooled rollers to reduce residual shrinkage. The multi-stage stretching process as seen in U.S. Pat. No. 4,113,935 is seldom used and even then mostly used for low shrinkage slit film tapes. The vast majority of slit film tapes are made using single stage stretching.

The method and device using several bundles of slit film tapes can be seen in WO 2006/037571. According to this method, prior to the drawing process the group of slit film tapes (strips) is separated into several sub-groups of slit film tapes and then sub-groups are drawn separately at high speed. However, this method requires new and expensive equipment.

The above method should not be mixed up with the process of stretching all slit film tapes together as a single group using conventional and relatively low cost equipment.

Prior art conventional single stage manufacturing equipment and methods involve the following process as shown in FIG. 1.

In general, the molten polyolefin is extruded through a suitable extrusion die to form sheet of required thickness which is suitably cooled by a device like water-quench or chilled roll(s). Then the substantially amorphous sheet is transported under tension to a suitable slitting device to be slit into film tapes. The slit film tapes are mono-axially oriented by drawing in a longitudinal direction, under heated conditions, to arrive at slit film tapes which can be defined in terms of an orientation ratio, sometimes also referred to as the draw or stretch ratio.

Thus the prior art provides for a method comprising:
extruding melt polymer through a die;
simultaneous quenching and melt-drawing of the molten polymer in a cooling device to form a film sheet;
slitting the film sheet into a plurality of relatively narrow slit film tapes;
stretching at elevated temperature, by passing the slit film tapes through a heating medium at a temperature just below the softening temperature of the slit film tapes;
annealing and cooling the oriented slit film tapes;
Winding the slit film tapes.

Processing speeds in slit film tape stretching lines have been increasing due to improvement in polymer, technology and market requirements. Fifteen years ago, the maximum operation speed was about 240 m/min whereas nowadays conventional equipment for processing of slit film tapes can operate at speeds up to 450 m/min depending on the material recipe (polymer and additives) and specification of end product i.e. slit film tapes.

The unstretched slit film tapes are heated by means of hot air oven to a temperature just below softening temperature during the drawing or stretching process. With the increase in processing speed, to have increased residential time, the length of the hot air oven has also increased from about 4 meters to about 6 meters. However, there is practical limit to the length of hot air oven, dictated by the handling of unsupported length of slit film tapes in oven. Thus, the basic methodology of prior art methods is to follow the process with single or multi-stage stretching at elevated temperatures and is limited to operating at maximum speeds of up to 450 m/min which results in many disadvantages when the speed of processing is increased beyond 450 m/min.

Moreover, it is well known to persons skilled in the art that as processing speeds increase, the tendency of individual slit film tapes to break during the stretching increases. These slit film tapes are generally "threaded" back, and the process continues without major interruption, but the broken slit film tapes till they can be threaded back by the operators go into waste and thereby reduce machine efficiency and produce unusable waste.

In case of speeds over 450 m/min, the tendency of individual slit film tapes to break increases beyond acceptable limits, sometimes leading to a complete shutdown of the operation and resulting losses in production and increased wastage.

Another disadvantage of prior art methods is that at higher speeds and usable total stretch ratios, the beginning of the necking down or so called "geometrical stretch initiation" progressively wanders back outside the hot air oven into an area where the temperature is lower than the required stretching temperature. This results in the uncontrolled 'cold stretching' and apart from causing breakages as described above, results in inadequate orientation of the polymer molecules chains and deterioration in mechanical properties like tenacity, elongation and other related quality parameters of slit film tapes.

Thus, there is a need for method to process slit film tapes with improved process stability at present normal process speeds and to allow processing speeds in excess of 450 m/min, say up to 750 m/min without the attendant disadvantages.

One object of the invention is to provide a method for processing of slit film tapes together as a single group using conventional and relatively low cost equipment.

A further object of the invention is to provide a method for the processing of slit film tapes with improved process stability in terms of reduced tape breakage rates.

Another object of the invention is to provide a method for processing of slit film tapes allowing processing speeds in excess of 450 m/min, say up to 750 m/min.

A further object of this invention is to provide an improved slit film tape processing apparatus that is not radically different from existing and widely used prior art equipment and hence can be manufactured at a reasonable cost.

The objects of this invention are met by the method and apparatus according to the claims appended hereto.

The invention relates to a method for processing slit film tapes and comprises the following steps:
- extruding melt polymer through a die;
- simultaneous quenching and melt-drawing of the molten polymer in the cooling device to form a film sheet;
- slitting the initial film sheet into a plurality of relatively narrow slit film tapes;
- stretching at elevated temperature, by passing the slit film tapes through a heating medium at a temperature just below the softening temperature of the slit film tapes;
- annealing and cooling the oriented slit film tapes;
- winding the slit film tapes;

characterized in that before the stretching step, it has a stage of pre-stretching made by passing the slit film tapes through one set of heated holding rollers tuning at a given speed and one set of cooled pre-stretch rollers turning faster than the heated holding rollers, wherein at least one of the rollers of the set of holding rollers is heated and at least one of the rollers of the set of pre-stretch rollers is cooled.

The contribution of the new process and apparatus vis-à-vis the known standard process and apparatus is an improvement in the process stability and processing speed of slit film tapes hitherto not attained with conventional equipment.

According to the invention, at least one of the rollers of the set of holding rollers is heated at a temperature up to 85° C., preferably up to 70° C. and at least one of the rollers of the set of pre-stretch rollers is cooled to a temperature between 15° C. to 45° C., preferably between 20° C. to 40° C.

According to the invention the pre-stretch ratio is between 20% and 80%, preferably between 35% and 70% of the total stretch-ratio and the total stretch ratio is between 3 and 12, preferably between 4 and 8.

In a preferred embodiment the processing speed is over 425 m/min and preferably over 600 m/min. The contribution of the new configurations vis-à-vis the known standard configurations is improvement in the processing speed of slit film tapes hitherto not attained. By the method of the invention, it is possible to process the slit film tapes at speeds in excess of 425 m/min which, amongst other advantages can increase the production speed and helps to save costs.

The invention also relates to an apparatus for performing the above method. The apparatus comprises the following elements: an extruder with a die, a cooling device, a film slitter unit, a holding unit, a heating device and a unit for stretching and annealing; wherein the holding unit comprises holding rollers designed to be heated. Moreover, between the holding unit and the heating device it further comprises a pre-stretching unit consisting of cooled pre-stretch rollers designed to be cooled.

The cooling device can be water bath including a quench roller; alternatively the cooling device can be chilled rolls The device of the invention and method of operation thereof allow processing with better process stability and better mechanical properties of slit film tapes than those achievable with standard process and apparatus under a given set of parameters (type and grade of polyolefin, slit film tape characteristics and speeds upto 450 m/min) and to allow processing speeds in excess of 450 m/min, preferably 600 m/min.

The invention also relates to the product obtained in the above cited method or using the apparatus cited above.

Preferably, the invented method is applicable to polyolefin material such as polypropylene (PP), high density polyethylene (HDPE) and linear low density polyethylene (LLDPE) and other similar polymeric material.

This material can be used as "virgin polymer" or blended with additives like anti-fibrillating agent, ultra-violet stabilizer, color master-batch, recycled polymer, etc.

DEFINITIONS

Unless otherwise specified, all references to "draw," "draw ratio," "stretch", "stretch ratio", "orientation" or "orientation ratio" refer to the stretching or drawing of the polymer tape in the longitudinal or machine direction.

The longitudinal or machine direction orientation can be accomplished through use of two sets of sequentially disposed rollers, the second or fast set of rollers operating at a speed in relation to slower set of rollers corresponding to desired orientation ratio. It is understood that a set of rollers comprise two or more rollers.

During stretching the slit film tapes in machine direction, they are heated by a heating device such as heated rollers or hot plate or preferably a convection heating unit, generally, a hot air oven, with the temperature range between 95° C. to 175° C.

During drawing slit film tapes through hot air oven, the set of slow holding rollers may be operated at any suitable speed, usually between 10 and 120 m/min in a production line. The set of fast stretching rollers are operated at a suitable speed, typically between 120 and 500 m/min in a production line, to provide a surface speed of about three or more times that of the set of slow holding rollers in order to orient the slit film tapes in the machine direction.

The "total stretch ratio" is the ratio obtained by dividing the surface speed of the fast stretching rollers by the surface speed of the slow holding rollers and generally has value between 3 and 12 preferably between 4 and 8.

The drawn slit film tapes ate then annealed, usually by using a set of ambient or preferably heated annealing rollers operating at almost same speed as stretching rollers and then cooling on a set of cooled annealing rollers operating at reduced surface speed than the stretching rollers giving final line speed between 100 to 450 m/min.

The "annealing ratio" is the ratio of the surface speeds of the cooled annealing rollers to the heated annealing rollers, and generally has a value between 0.90 and 0.98.

The "processing speed" is equal to surface speed of the cooled annealing roller.

The slit film tapes generally have a width between 0.8 mm to 60 mm, a thickness between 0.015 mm and 0.1 mm and a denier between 250 and 45,000. Preferably the width is between 2 mm and 5 mm, thickness is between 0.025 mm and 0.07 mm and denier is between 500 and 1500.

Figure 2:
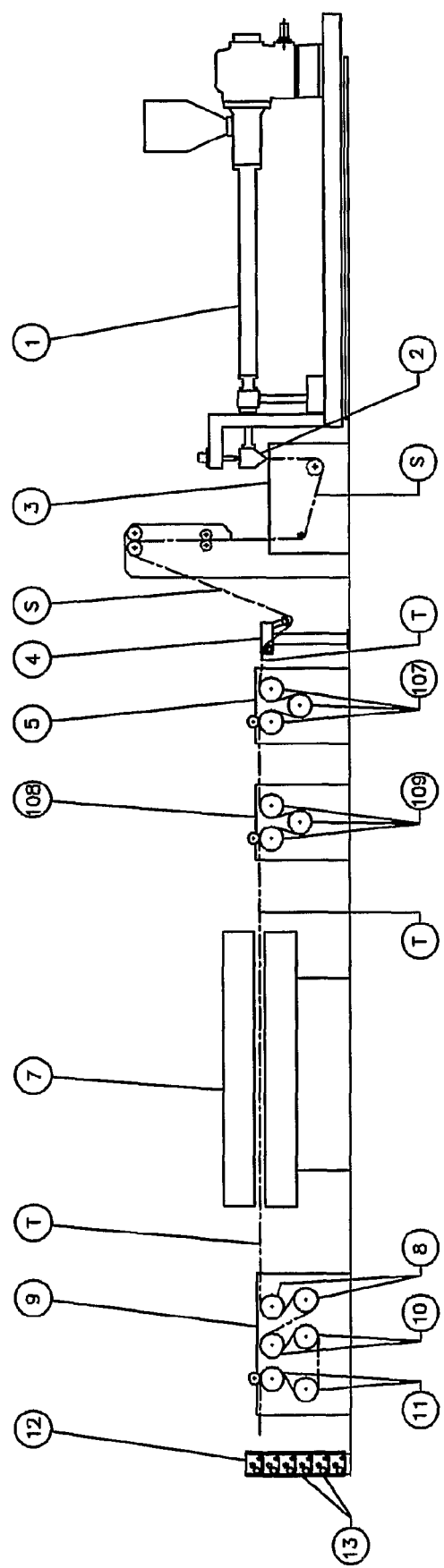

The present invention will now be described with reference to the accompanying drawings, in which FIG. 1 is a single stage stretching process according to the prior art; and FIG. 2 is a process with pre-stretch stage according to the invention.

SINGLE STAGE STRETCHING PROCESS AND EQUIPMENT

FIG. 1 is a line diagram of a conventional single stage slit film tape stretching equipment. The method of operation involves the following:

The screw extruder 1, equipped with a suitable extrusion die 2 produces a flat molten film sheet S from the polymer.

This initial molten film sheet S coming out from the die 2 falls in a cooling device 3 such as water in the water bath and gets solidified as a film sheet. The film sheet S is melt-drawn between the die lip 2 and the quench roller. The film S is then fed under tension with the help of the rollers above the water bath to the film slitting unit 4. The film slitting unit 4 slits the initial film sheet S into a plurality of relatively narrow slit film tapes T.

The slit film tapes T are led to a holding unit 5 to be fed over the first set of rollers 6 known as holding rollers, which are generally at ambient temperature.

The slit film tapes T are thereafter led through the heating device 7 such as a hot plate, heated rollers or a convection heating device, preferably a hot air oven to the set of higher speed rollers 8 typically referred as stretching rollers. The total stretch ratio has a value between 3 and 12. The hot air oven is usually operated at a temperature between 95° C. and 175° C. In this process, slit film tapes T get fully stretched hence fully drawn/oriented.

The drawn slit film tapes are then annealed, usually by passing them over a set of heated or ambient rollers, preferably heated rollers 10 running at almost the same speed as the stretching rollers 8 and then over a set of cooled rollers 11, operating at reduced surface speed than the stretching rollers 8.

The stretching rollers 8, the ambient or heated annealing rollers 10 and the cooled annealing rollers 11 can be mounted on individual frames or mounted on a common frame, together known as stretching aid annealing unit 9.

At the final roller of holding unit 5 and stretching and annealing unit 9 there is, in general, an auxiliary pressure roller resting on the slit film tapes in normal operation to provide a better controlled feed from last roller of each unit to the next operation; this roller can be lifted and turned to one side when threading the slit film tapes.

The heated annealing rollers 10 are usually heated to a temperature between 90° C. and 130° C. The cooled annealing rollers 11 are usually cooled to a temperature between 15° C. and 25° C. The annealing ratio is between 0.90 and 0.98.

The slit film tapes are then wound on cylindrical bobbins on a winding device 12 consisting of a plurality of winders 13.

Multi-Stage Stretching Process

In the prior art machines for slit film tape production, in case of multi-stage stretching, it is usual to perform the multi-stage stretching through successive stretching stages, with each stage having a higher temperature than the previous stage, the minimum being 95° C.

Invention

The present invention modifies the prior art process by adding a pre-stretching stage wherein the slit film tapes are cooled after pre-stretching the same, there by stabilizing the molecular structure of slit film tapes after the pre-stretching operation and before the single or multi-stage stretching. This results in die required product quality along with process stability being maintained even with the increase in process speed up to 750 m/min, more preferred 600 m/min.

FIG. 2 is a line diagram of the apparatus according to the invention.

The screw extruder 1, equipped with a suitable extrusion die 2 produces a flat molten film sheet S from the polymer. This initial molten film sheet S coming out from the die 2 falls in a cooling device 3 such as water in the water bath and gets solidified as a film sheet. The film sheet S is melt-drawn between the die lip 2 and the quench roller in the water bath.

The film S is then fed under tension with the help of the rollers above the water bath to the film slitting unit 4. The film slitting unit 4 slits the initial film sheet S into a plurality of relatively narrow slit film tapes T.

The slit film tapes T are led to a holding unit 5 to be fed over the first set of rollers 107 known as holding rollers. According to the invention, at least one of the rollers of the set of holding rollers 107 is heated at a temperature up to 85° C.

The heated slit film tapes T are led through a pre-stretch unit 108 where they pass over a set of pre-stretch rollers 109 turning faster than the holding rollers 107 and at least one of these pre-stretch rollers is cooled to temperature between 15° C. to 45° C.

Thus the slit film tapes are pre-stretched by passing through a set of heated holding rollers 107 at a temperature significantly below softening temperature of the slit film tapes T and one set of cooled pre-stretch rollers 109 wherein at least one roller of the set of holding rollers is heated and at least one of die rollers of the set of pre-stretch rollers is cooled.

Although the applicants do not wish to be bound by any theory, it is believed that when the slit film tapes are stretched significantly below the softening temperature, energy is released whereby the slit film tapes are self heated, usually but not always, to a temperature higher than the heated holding rollers. By cooling the second set of rollers (pre-stretch rollers), the said heat is taken away thereby stabilizing the slit film tapes before the normal stretching which results in a higher process stability, enabling a lower tape breakage rate and/or increased process speeds Within the frame of this invention the "pre-stretch ratio" is defined as the ratio of the surface speeds of the pre-stretch rollers 109 to the holding rollers 107 and according to the present invention the pre-stretch ratio is between 20% and 80% of the total stretch ratio.

In a preferred embodiment, the pre-stretch ratio is between 35% and 70% of the total stretch ratio. Further, at least one roller of the set of holding rollers is heated at a temperature up to 85° C., preferably up to 70° C., and at least one of the rollers of the set of the pre-stretch rollers is cooled to a temperature between 15° C. to 45° C., preferably between 20° C. to 40° C.

The pre-stretched partially oriented slit film tapes T are thereafter led through the heating device 7 such as a hot plate, heated rollers or a convection heating device, preferably a hot air oven to the set of higher speed stretching rollers 8.

The total stretch ratio is between 3 and 12. The hot air oven 7 is usually operated at a temperature between 95° C. and 175° C. In this process, slit film tapes T get fully stretched hence fully drawn/oriented.

The drawn slit film tapes are then annealed usually by passing them over a set of heated or ambient rollers, preferably heated annealing rollers 10 running at almost the same speed as the stretching rollers 8 and then over a set of cooled annealing rollers 11, operating at reduced surface speed than the stretching rollers 8.

The stretching rollers 8, the ambient or heated annealing rollers 10 and the cooled annealing rollers 11 can be mounted on individual frames or mounted on a common frame, together known as stretching and annealing unit 9.

At the final roller of holding unit 5 and stretching and annealing unit 9 there can be an auxiliary pressure roller that rests on the slit film tapes in normal operation to provide a better controlled feed from the last roller of each unit to the next operation; this roller can be lifted and turned to one side when threading the slit film tapes.

The heated annealing rollers 10 are usually heated to a temperature between 90° C. and 130° C. The cooled annealing rollers 11 ate usually cooled to a temperature between 15° C. and 25° C. The annealing ratio is between 0.90 and 0.98.

The slit film tapes ate then wound on cylindrical bobbins on a winding device 12 consisting of a plurality of winders 13.

Thus, depending on the film-forming polyolefin, the additives and the required properties of the slit film tapes as per the end-use application, the parameters can be varied as follows:
the holding roller temperature up to 85° C.,
the pre-stretch ratio between 20% to 80% of total stretch ratio,
the pre-stretch roller temperature between 15° C. and 45° C., and
the total stretch ratio between 3 and 12.

The invention also relates to an apparatus for performing the above method. Said apparatus comprises the following elements: an extruder 1 with a die 2, a cooling device 3, a film slitter unit 4, a holding unit 5, a heating device 7 and a unit for stretching and annealing 9, wherein the holding unit comprises holding rollers 107 designed to be heated. Moreover, between the holding unit 6 and the heating device 8, it further comprises a pre-stretching unit 108 consisting of pre-stretch rollers 109 designed to be cooled.

The following examples are intended to illustrate and provide a better understanding of the invention and not restrict or limit the scope thereof.

EXAMPLES

The polypropylene polymer used in the experiments is sold by the company Reliance Industries Limited, India under the name REPOL, grade H030SG, batch number JO610090 with a melt flow index 3 g/10 min as per ASTM D1238. The Anti-fibrillating agent is sold by the company Superpack, India, grade PLAST WHITE.

In the experiments following equipment, modified as per invention was used:
Tape Stretching Line: LOREX, by Lohia Stager Limited; this line includes screw extruder, extrusion die, water bath, film slitting unit, holding unit, hot air oven, stretching and annealing unit.
Winders: LS250HS, by Lohia Stager Limited.

In the experiments, the tenacity and elongation at break were determined according to BS EN ISO 2062:1995

Comparative Example 1

In this Example according to the state of the art slit film tapes are made with 90% polypropylene and 10% anti-fibrillating agent.

The initial film sheet produced by the suitable means equipped with an extrusion die is extruded from 0.4 mm die lip gap at a melt temperature of 260° C. and falls into the water bath with a gap of about 40 mm between the die lip and the water level and gets solidified as a film sheet while inside the water. Thereafter the film is drawn around the quench roller in the water bath and fed via other rollers to the film slitter unit. The extruded film is slit into a single bundle of 170 slit film tapes. The slit film tapes have a thickness of 0.064 mm and a width of 5.7 mm before drawing.

The film is then subjected to a single stage unidirectional stretching by entering into the hot air oven of 6 meters held at 165° C. Before the oven, the holding rollers are rotating at a speed of 83.8 m/min; and after the oven the stretching rollers are rotating at a speed of 424 m/min giving a total stretch ratio of 5.06. Thereafter the slit film tapes are annealed at a heated annealing roller temperature of 130° C. and then relaxed to annealing ratio of 0.94. The speed of the cooled annealing rollers maintained at 25° C. is 400 m/min. Finally the slit film tapes are cross-wound on winders in the winding device. The process speed of this process is 400 m/min. The process has an average of 8 to 10 breaks/hour.

The slit film tapes obtained have the following properties:
Width: 2.5 mm
Thickness: 0.029 mm
Size 610 denier
Breaking tenacity: 5.3 gr/denier
Elongation at break: 23%

Comparative Example 2

In this Example slit film tapes are made with 95.2% polypropylene and 4.8% anti-fibrillating agent.

The initial film sheet produced by the suitable means equipped with an extrusion die is extruded from 0.4 mm die lip gap at a melt temperature of 260° C. and falls into the water bath with a gap of about 40 mm between the die lip and the water level and gets solidified as a film sheet while inside the water. Thereafter, the film is drawn around the quench roller in the water bath and fed via other rollers to the film slitter unit. The extruded film is slit into a single bundle of 170 slit film tapes. The slit film tapes have a thickness of 0.089 mm and a width of 5.8 mm before drawing.

The film is then subjected to a single stage unidirectional stretching by entering into the hot air oven of 6 meters held at 165° C. Before the oven, the holding rollers are rotating at a speed of 80 m/min; and after the oven the stretching rollers are rotating at a speed of 425 m/min giving a total stretch ratio of 5.31.

Thereafter, the slit film tapes are annealed at a heated annealing roller temperature of 130° C. and then relaxed to annealing ratio of 0.94. The speed of the cooled annealing rollers maintained at 25° C. is 400 m/min. Finally, the slit film tapes are cross-wound on winders in the winding device. The process speed of this process is 400 m/min. The process has an average of 6 to 8 breaks/hour.

The slit film tapes obtained have the following properties:
Width: 2.5 mm
Thickness: 0.039 mm
Size 804 denier
Breaking tenacity: 5.2 gr/denier
Elongation at break: 25%

Example 1

In this Example according to the invention slit film tapes are made with 90% polypropylene and 10% anti-fibrillating agent like in comparative example 1. The extruded film is slit to a single bundle of 170 slit film tapes. The slit film tapes have a thickness of 0.064 mm and a width of 5.7 mm before drawing.

The film is then subjected to unidirectional stretching by entering into hot air oven of 6 meters held at 154° C. Before the oven, all holding rollers at 48° C. are rotating at a speed of 84.0 m/min; all pre-stretching rollers at 30° C. are rotating at a speed of 206.7 m/min giving a pre-stretch ratio of 2.46 and after the oven, stretching rollers are rotating at a speed of 424 m/min giving a total stretch ratio of 5.05.

Thereafter the slit film tapes are annealed at a heated annealing roller temperature of 130° C. and then relaxed to annealing ratio of 0.95. The speed of the cooled annealing rollers maintained at 25° C. is 401 m/min. Finally the slit film tapes are cross-wound on winders in the winding device. The process speed of this process is 401 m/min. The process has an average of 1 to 2 breaks/hour and shows that keeping the same process speed the average breaks can be reduced considerably.

The slit film tapes obtained have the following properties:
Width: 2.5 mm
Thickness: 0.029 mm
Size (titer) 611 denier
Breaking tenacity: 5.9 gr/denier
Elongation at break: 25%

Example 2

In this Example according to the invention slit film tapes are made with 90% polypropylene and 10% anti-fibrillating agent like in comparative example 1. The extruded film is slit to a single bundle of 166 slit film tapes. The slit film tapes have a thickness of 0.066 mm and a width of 5.5 mm before drawing.

The film is then subjected to unidirectional stretching by entering into the hot air oven of 6 meters held at 160° C. Before the oven, all the holding rollers at 50° C. are rotating at a speed of 130.6 m/min; all the pre-stretching rollers at 30° C. are rotating at a speed of 311.7 m/min giving a pre-stretch ratio of 2.39 and after the oven, stretching rollers were rotating at a speed of 630 m/min giving a total stretch ratio of 4.82.

Thereafter the slit film tapes are annealed at a heated annealing roller temperature of 140° C. and then relaxed to annealing ratio of 0.95. The speed of the cooled annealing rollers maintained at 25° C. is 600 m/min. Finally the slit film tapes are cross-wound on winders in the winding device. The process speed of this process is 600 m/min. The process has an average of 6 to 8 breaks/hour and shows that, keeping the same average breaks, the process speed can be increased considerably.

The slit film tapes obtained have the following properties:
Width: 2.5 mm
Thickness: 0.028 mm
Size (titer) 606 denier
Breaking tenacity: 5.4 gr/denier
Elongation at break: 27%

Example 3

In this Example according to the invention slit film tapes are made with 95.2% polypropylene and 4.8% anti-fibrillating agent like in comparative example 2. The extruded film is slit to a single bundle of 170 slit film tapes. The slit film tapes have a thickness of 0.090 mm and a width of 5.7 mm before drawing.

The film is then subjected to unidirectional stretching by entering into the hot air oven of 6 meters held at 155° C. Before the oven, all the holding rollers at 49° C. are rotating at a speed of 82 m/min; all the pre-stretching rollers at 28° C. are rotating at a speed of 204 m/min giving a pre-stretch ratio of 2.49 and after the oven, the stretching rollers were rotating at a speed of 424 m/min giving a total stretch ratio of 5.17.

Thereafter slit film tapes are annealed at a heated annealing roller temperature of 130° C. and then relaxed to annealing ratio of 0.95. The speed of the cooled annealing rollers maintained at 25° C. is 402 m/min. Finally the slit film tapes are cross-wound on winders in the winding device. The process speed of this process is 402 m/min. The process has an average of 1 to 2 breaks/hour and shows that keeping the same process speed the average breaks can be reduced considerably.

The slit film tapes obtained have the following properties:
Width: 2.5 mm
Thickness: 0.039 mm
Size (titer) 806 denier
Breaking tenacity: 5.5 gr/denier
Elongation at break: 27%

Example 4

In this Example according to the invention slit film tapes are made with 95.2% polypropylene and 4.8% anti-fibrillating agent like in comparative example 2. The extruded film is slit to a single bundle of 166 slit film tapes. The slit film tapes have a thickness of 0.092 mm and a width of 5.6 mm before drawing.

The film is then subjected to unidirectional stretching by entering into the hot air oven of 6 meters held at 160° C. Before the oven, all the holding rollers at 50° C. are rotating at a speed of 129.5 m/min; all the pre-stretching rollers at 28° C. are rotating at a speed of 320 m/min giving a pre-stretch ratio of 2.47 and after the oven, stretching rollers were rotating at a speed of 634 m/min giving a total stretch ratio of 4.90.

Thereafter slit film tapes are annealed at a heated roller temperature of 140° C. and then relaxed to annealing ratio of 0.95. The speed of the cooled rollers maintained at 25° C. is 601 m/min. Finally the slit film tapes are cross-wound on winders in the winding device. The process speed of this process is 601 m/min. The process has an average of 4 to 6 breaks/hour and showers that keeping the same average breaks, the process speed can be increased considerably.

The slit film tapes obtained have the following properties:
Width: 2.5 mm
Thickness: 0.039 mm
Size (titer) 805 denier
Breaking tenacity: 5.3 gr/denier
Elongation at break: 26%

INDUSTRIAL APPLICATION

The method and the apparatus according to the invention can be used to produce at high speed slit film tapes to be used in manufacture of woven sacks, large industrial sacks and packaging fabrics, geo-textiles, ropes and twines and miscellaneous industrial woven fabrics.

It must be realized that modifications and variations are possible based on the disclosure given above without departing from the spirit and scope of the invention.

| Reference List | |
| --- | --- |
| 1 | Screw extruder |
| 2 | Extrusion die |
| 3 | Cooling device, water bath |
| 4 | Film slitting unit |
| 5 | Holding unit |
| 6 | First set of rollers, holding rollers |
| 7 | Heating device |
| 8 | Stretching rollers |
| 9 | Unit for stretching and annealing |
| 10 | Heated annealing rollers |
| 11 | Cooled annealing rollers |
| 12 | Winding device |
| 13 | Winders |
| 107 | Heated holding rollers |
| 108 | Pre-stretch unit |
| 109 | Cooled Pre-stretch rollers |

| | Reference List |
|---|---|
| S | Film sheet |
| T | Slit film tapes |

We claim:

1. A method for producing oriented slit film tapes, comprising the following steps:
   a) extruding melt polyolefin polymer through a die;
   b) simultaneous quenching and melt-drawing of the molten polymer in a cooling device to form a film sheet;
   c) slitting the initial film sheet into a plurality of relatively narrow slit film tapes;
   d) stretching at elevated temperature, by passing the slit film tapes through a heating medium at a temperature just below the softening temperature of the slit film tapes;
   e) annealing and cooling the oriented slit film tapes;
   f) winding the slit film tapes;
   wherein before the stretching step, the method further comprises a stage of pre-stretching made by passing the slit film tapes through one set of holding rollers turning at a given speed and one set of pre-stretch rollers turning faster than the holding rollers, wherein at least one of the rollers of the set of holding rollers is heated at a temperature between 48° C. to 85° C. and at least one of the rollers of the set of pre-stretch rollers is cooled to a temperature between 15° C. to 45° C.

2. The method according to claim 1, wherein at least one of the rollers of the set of holding rollers is heated up to 70° C.

3. The method according to claim 1, wherein at least one of the rollers of the set of the pre-stretch rollers is cooled between 20° C. to 40° C.

4. The method according to claim 1, wherein the prestretch ratio is between 20% and 80%.

5. The method according to claim 1, wherein the total stretch ratio is between 3 and 12.

6. The method according to claim 1, wherein the processing speed is over 425 m/min.

7. The method according to claim 1, wherein the processing speed is over 600 m/min.

8. The method according to claim 1, wherein said polyolefin comprises polypropylene (PP), high density polyethylene (HDPE) or linear low density polyethylene (LLDPE), said polyolefin provided as virgin polymer or blended with one or more of an anti-fibrillating agent, an ultraviolet stabilizer, a color masterbatch and recycled polymer.

9. A method for producing oriented slit film tapes, comprising the following steps:
   a) extruding melt polyolefin polymer through a die;
   b) simultaneous quenching and melt-drawing of the molten polymer in a cooling device to form a film sheet;
   c) slitting the initial film sheet into a plurality of relatively narrow slit film tapes;
   d) stretching at elevated temperature, by passing the slit film tapes through a heating medium at a temperature just below the softening temperature of the slit film tapes;
   e) annealing and cooling the oriented slit film tapes;
   f) winding the slit film tapes;
   wherein before the stretching step, the method further comprises a stage of pre-stretching made by passing the slit film tapes through one set of holding rollers turning at a given speed and one set of pre-stretch rollers turning faster than the holding rollers, wherein at least one of the rollers of the set of holding rollers is heated at a temperature between 48° C. to 85° C. and at least one of the rollers of the set of pre-stretch rollers is cooled to a temperature between 15° C. to 30° C.

10. The method according to claim 9, wherein at least one of the rollers of the set of holding rollers is heated up to 70° C.

11. The method according to claim 9, wherein the pre-stretch ratio is between 20% and 80%.

12. The method according to claim 9, wherein the total stretch ratio is between 3 and 12.

13. The method according to claim 9, wherein the processing speed is over 425 m/min.

14. The method according to claim 9, wherein the processing speed is over 600 m/min.

15. The method according to claim 9, wherein said polyolefin comprises polypropylene (PP), high density polyethylene (HDPE) or linear low density polyethylene (LLDPE), said polyolefin provided as virgin polymer or blended with one or more of an anti-fibrillating agent, an ultraviolet stabilizer, a color masterbatch and recycled polymer.

* * * * *